United States Patent
Lim et al.

(10) Patent No.: US 8,909,276 B2
(45) Date of Patent: Dec. 9, 2014

(54) METHOD AND APPARATUS FOR OBTAINING SYNCHRONIZATION FOR COMMUNICATION BETWEEN DEVICES

(75) Inventors: Chi-Woo Lim, Suwon-si (KR); Hyun-Kyu Yu, Yongin-si (KR); Kyung-Kyu Kim, Seoul (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 13/527,001

(22) Filed: Jun. 19, 2012

(65) Prior Publication Data

US 2012/0320776 A1    Dec. 20, 2012

(30) Foreign Application Priority Data

Jun. 20, 2011    (KR) .................. 10-2011-0059581

(51) Int. Cl.
*H04B 7/00*    (2006.01)
*H04W 56/00*   (2009.01)

(52) U.S. Cl.
CPC .................. *H04W 56/002* (2013.01)
USPC .......... 455/517; 455/502; 455/41.2; 370/252; 370/350; 370/338

(58) Field of Classification Search
USPC .......... 370/252, 350, 338; 455/518–520, 502, 455/450, 41.2
See application file for complete search history.

(56) References Cited

U.S. PATENT DOCUMENTS

| | | | | |
|---|---|---|---|---|
| 5,949,776 A * | 9/1999 | Mahany et al. | ............... | 370/338 |
| 6,650,629 B1 * | 11/2003 | Takahashi et al. | ............ | 370/335 |
| 6,671,525 B2 * | 12/2003 | Allen et al. | ................... | 455/574 |
| 7,079,812 B2 * | 7/2006 | Miller et al. | ................. | 455/63.1 |
| 7,120,390 B2 * | 10/2006 | Grundvig et al. | ............ | 455/41.2 |
| 7,212,823 B2 * | 5/2007 | Granzow et al. | ............. | 455/450 |
| 7,450,974 B2 * | 11/2008 | Bennett et al. | ................ | 455/574 |
| 7,684,813 B2 * | 3/2010 | Benson et al. | ................ | 455/517 |
| 7,961,696 B2 * | 6/2011 | Ma et al. | ....................... | 370/344 |
| 8,010,138 B2 * | 8/2011 | Kuru | ............................. | 455/502 |
| 8,170,484 B2 * | 5/2012 | Karaoguz et al. | ............ | 455/41.2 |
| 8,213,405 B2 * | 7/2012 | Horn et al. | .................... | 370/350 |
| 8,259,827 B2 * | 9/2012 | Ramesh et al. | ............... | 375/260 |
| 8,340,672 B2 * | 12/2012 | Brown et al. | ................. | 455/443 |
| 8,634,831 B2 * | 1/2014 | Jung et al. | .................... | 455/434 |
| 2005/0143006 A1 * | 6/2005 | Tailor | .......................... | 455/41.2 |
| 2009/0291686 A1 * | 11/2009 | Alpert et al. | ................. | 455/436 |

\* cited by examiner

*Primary Examiner* — Sharad Rampuria
(74) *Attorney, Agent, or Firm* — Jefferson IP Law, LLP

(57) ABSTRACT

A method and an apparatus for obtaining synchronization of a terminal for communication between devices when a base station collapses are provided. The method includes, when a preamble signal is not received from the base station, maintaining a first synchronization for a predetermined time using a timer, transmitting a first preamble signal at a first synchronization point, performing a synchronization procedure with at least one neighbor terminal based on the first preamble signal, and, after the synchronization procedure, performing communication with the at least one neighbor terminal. In addition, when a preamble signal is not received from a base station, a first preamble signal from a relevant neighbor terminal is monitored for a predetermined time. When the first preamble signal is not received from the relevant neighbor terminal for the predetermined time, a second preamble signal is transmitted at an arbitrary point.

26 Claims, 5 Drawing Sheets

METHOD AND APPARATUS FOR OBTAINING SYNCHRONIZATION FOR COMMUNICATION BETWEEN DEVICES

PRIORITY

This application claims the benefit under 35 U.S.C. §119 (a) of a Korean patent application filed in the Korean Intellectual Property Office on Jun. 20, 2011 and assigned Serial No. 10-2011-0059581, the entire disclosure of which is hereby incorporated by reference.

BACKGROUND OF THE INVENTION

1. Field of the Invention

The present invention relates to a wireless communication system. More particularly, the present invention relates to a method and an apparatus for obtaining synchronization for direct communication between devices.

2. Description of the Related Art

A communication company establishes a communication infrastructure to provide various communication services to users. For example, a mobile communication company establishes a plurality of base stations inside a service area to allow a User Equipment (UE) to be connected to one of the base stations and receive a service. For example, when a first UE communicates with another UE, the communication is made through the communication infrastructure, such as a base station.

However, there may be times when one of various problems is generated in the infrastructure (for example, a base station) such that the infrastructure no longer operates properly. In consideration of such a condition, research for supporting direct communication between terminals that have performed communication via a relevant infrastructure is under progress. As part of the direct communication, obtaining synchronization between terminals in direct communication is important.

Therefore, a method and an apparatus for obtaining synchronization for direction communication between devices in the case where an infrastructure does not operate in an infrastructure-based communication system are required.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for obtaining synchronization for direction communication between devices in the case where an infrastructure does not operate in an infrastructure-based communication system.

Another aspect of the present invention is to provide a method and an apparatus for reducing interference between a terminal of an environment where an infrastructure does not operate and a terminal that receives a service from the infrastructure of a neighbor area in an infrastructure-based communication system.

In accordance with an aspect of the present invention, a method for obtaining synchronization of a terminal for communication between devices when a base station collapses is provided. The method includes, when not receiving a preamble signal from the base station, maintaining, at the terminal, a first synchronization for a predetermined time using a timer, transmitting, at the terminal, a first preamble signal at a first synchronization point, performing, at the terminal, a synchronization procedure with at least one neighbor terminal based on the first preamble signal, and after the synchronization procedure, performing communication with the at least one neighbor terminal.

In accordance with another aspect of the present invention, an apparatus of a terminal, for obtaining synchronization for communication between devices when a base station collapses is provided. The apparatus includes a transmitter for, when a preamble signal is not received from the base station, allowing the terminal to maintain a first synchronization for a predetermined time using a timer and for allowing the terminal to transmit a first preamble signal at a first synchronization point, and a controller for allowing the terminal to perform a synchronization procedure with at least one neighbor terminal based on the first preamble signal and for allowing the terminal, after the synchronization procedure, to perform communication with the at least one neighbor terminal.

In accordance with another aspect of the present invention, an apparatus of a terminal, for obtaining synchronization for communication between devices when a base station collapses is provided. The apparatus includes a controller for, when a preamble signal is not received from the base station, monitoring a first preamble signal from a relevant neighbor terminal for a predetermined time, and a transmitter for, when the first preamble signal is not received from the relevant neighbor terminal for the predetermined time, transmitting a second preamble signal at an arbitrary point, wherein the controller performs a synchronization procedure with at least one neighbor terminal using the second preamble signal, and after the synchronization procedure, performs communication with the at least one neighbor terminal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
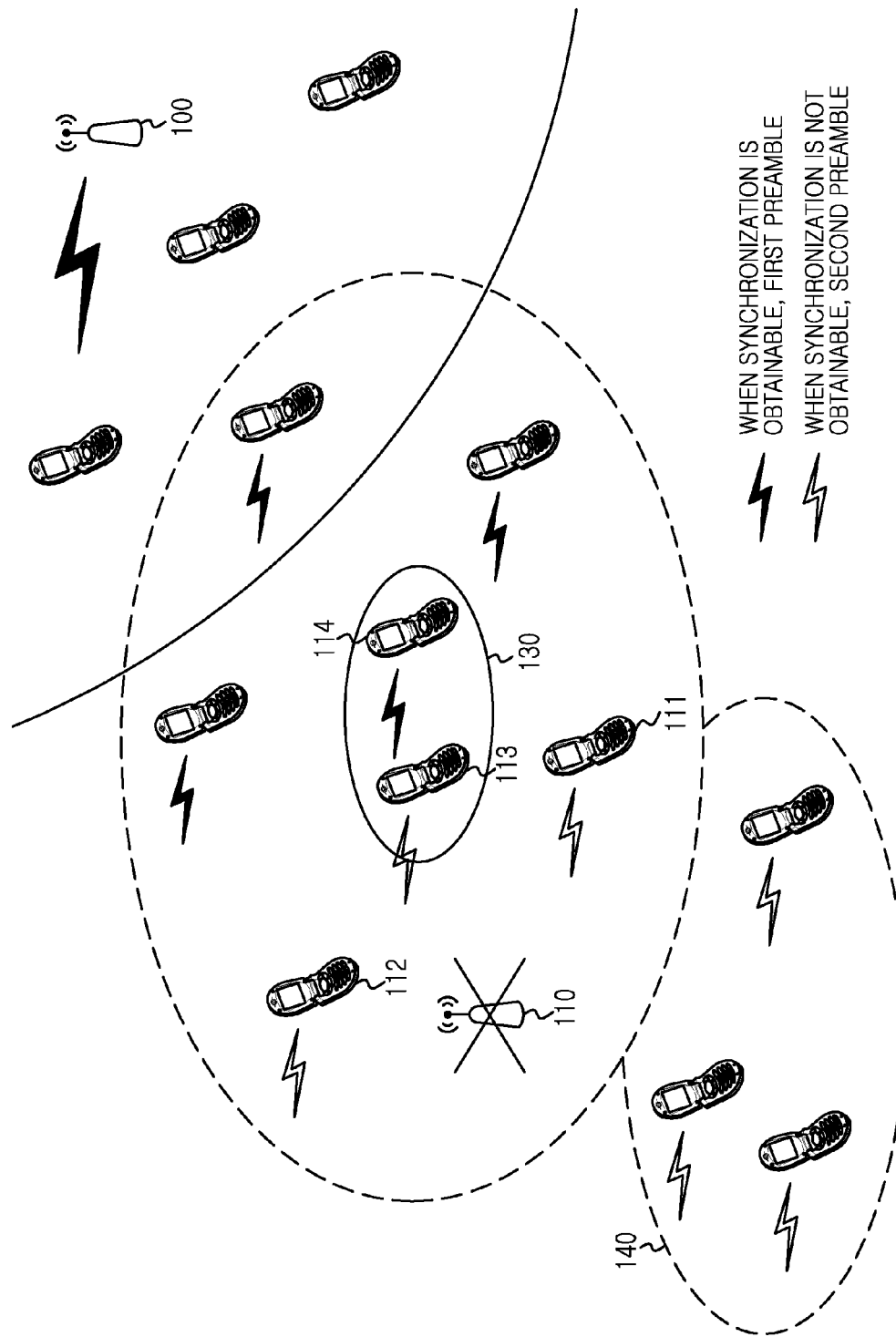
FIG. 1 is a view illustrating a synchronization obtain scenario for direction communication between devices in a case where an infrastructure does not operate according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and an apparatus for obtaining synchronization for direct communication between devices in a case where an infrastructure does not operate in an infrastructure-based communication system.

Exemplary embodiments of the present invention provide a method and an apparatus for obtaining synchronization for direct communication between devices in a case where an infrastructure does not operate. More particularly, exemplary embodiments of the present invention provide a method and an apparatus for obtaining, at devices, synchronization between the devices using two types of synchronization signals (e.g., preamble) when an infrastructure does not operate or collapses. In the following description, the term "collapse" is used as a general term to designate a mechanical, structural, electrical, functional, or any type of failure or event that renders the infrastructure unable to perform its intended duty.

In addition, exemplary embodiments of the present invention consider a problem of reducing interference between a terminal performing inter-device communication due to an infrastructure disorder or collapse and a terminal performing communication via a neighbor infrastructure under an environment where the infrastructure of a relevant area does not operate but the infrastructure of the neighbor area continues to operate.

In an infrastructure-based communication system (for example, an Institute of Electrical and Electronics Engineers (IEEE) 802.16 system), when a problem occurs at a base station that serves as the infrastructure such that the base station does not operate, devices in the cell serviced by the base station can no longer perform communication via the base station. In this case, direct communication between devices may be required. To enable direct communication between devices, synchronization between devices, obtained with a synchronization signal, is first required. The synchronization signal should be designed such that the infrastructure may maintain the same form as that before the infrastructure problem and such that an influence on the operation of a device may be minimized. Therefore, a reference signal for obtaining synchronization between terminals has the same structure as a preamble signal under the infrastructure. For example, in case of a system using the IEEE 802.16e standard, a preamble signal is used. In case of a system using the IEEE 802.16m standard, a Primary Synchronization Channel (P-SCH) is used. Considering an aspect of a structure, the same structure as a preamble of an existing system is used but a preamble sequence used for obtaining synchronization between terminals should be discriminated from that used in an existing system. In the case where a reserved sequence exists as in the case of an IEEE 802.16m system, a portion of the reserved sequence may be used. In the case where a reserved sequence does not exist as in the case of an IEEE 802.16e system, a sequence having a similar performance while not having an influence on an existing preamble performance may be newly defined.

FIG. 1 is a view illustrating a synchronization obtain scenario for direction communication between devices in a case where an infrastructure does not operate according to an exemplary embodiment of the present invention.

Referring to FIG. 1, a plurality of base stations 100 and 110 exist inside a service area, and each base station 100 and 110 is connected with a plurality of terminals inside its own cell area. Under this infrastructure environment, it is assumed that the base station 110 can longer provide service due to a natural disaster or an unexpected problem and that the base station 100 normally operates. It is also assumed that terminals do not immediately lose synchronization even when the base station 110 collapses but maintain synchronization for a predetermined time via a timer.

When the base station 110 can no longer provide service, that is, the base station 110 cannot transmit a synchronization signal or a preamble signal, terminals located inside the cell area of the base station 110 first attempt direct communication between devices in order to perform communication without the use of the base station 110. For communication between devices or direct communication between terminals, a synchronization procedure between devices or terminals should be preceded.

For synchronization between devices, an exemplary embodiment of the present invention proposes that terminals obtain synchronization between devices using two preamble signals (or synchronization signals). The two preamble signals include a first preamble signal transmitted by a terminal that maintains base station synchronization for a predetermined time when a base station collapses, and a second preamble signal transmitted by a terminal that does not maintain base station synchronization after a predetermined time when a base station collapses. Here, the base station denotes timing at which a base station transmits a preamble. In other words, a point at which the first preamble signal is transmitted is the same as a point at which the base station transmits a preamble, and a point at which the second preamble signal is transmitted does not coincide with a point at which the base station transmits the preamble. The preamble signal transmitted by the base station is used as not only a synchronization signal but also information that can discriminate a base station. The first preamble signal and the second preamble signal are used as not only a synchronization signal for communication between devices but also information indicating that a relevant base station has collapsed.

An exemplary synchronization procedure between devices is described. When the base station collapses, each terminal inside a cell of the base station first tries to receive the first preamble signal. When not receiving the first preamble signal for a predetermined time, each of the terminals tries to receive the second preamble signal. When receiving the first preamble signal, each of the terminals synchronizes between devices based on the first preamble signal. Otherwise, each of the terminals synchronizes between devices based on the second preamble signal. Even in the case where synchronization has been performed based on the second preamble signal, the terminal tries to receive the first preamble signal every predetermined period to re-perform synchronization between devices based on the first preamble signal. Though this, an exemplary embodiment of the present invention may minimize interference between terminals inside a cell where a base station has collapsed and terminals inside a cell where a base station has not collapsed.

For example, when the base station 110 collapses, a portion of terminals located inside the cell of the base station 110 may obtain base station synchronization under influence of a neighbor base station 100 that has not collapsed, and the rest of the terminals may not obtain base station synchronization. Here, the terminals that have obtained the base station synchronization transmit the first preamble, and the terminals that have not obtained the base station synchronization transmit the second preamble.

For example, a terminal 113 that has not maintained the base station synchronization transmits the second preamble signal in order to synchronize with neighbor terminals. After transmitting the second preamble signal, the terminal 113 monitors whether a preamble signal from a base station or the first preamble signal from a neighbor base station is transmitted. At this point, when receiving the first preamble signal from a neighbor terminal 114 that maintains the base station synchronization inside a relevant region 130, the terminal 113 that has not maintained the base station synchronization may end communication synchronized using the existing second preamble signal, and may be synchronized using the received first preamble signal. When receiving a preamble signal from the base station 110, the terminal 113 that has not maintained the base station synchronization ends communication synchronized using the existing second preamble signal and is synchronized using the received preamble signal of the base station 110.

Likewise, when receiving the first preamble signal from the neighbor terminal 114 synchronized using the first preamble signal, terminals 112 and 111 that have not maintained the base station synchronization may be synchronized using the first preamble signal. However, when not receiving the first preamble signal from neighbor terminals, the terminals located inside a region 140 continue to maintain synchronization based on the second preamble signal.

As described above, when a portion of terminals inside a cell where a base station has collapsed maintains base station synchronization even though terminals inside the cell where the base station has collapsed do not maintain the base station synchronization, the terminals that have not maintained the base station synchronization may maintain the base station synchronization afterward by a terminal that maintains the base station synchronization. Therefore, since terminals inside the cell where the base station has collapsed are synchronized with terminals of a neighbor base station, communication between terminals inside the cell where the base station has collapsed does not influence a neighbor cell.

Meanwhile, a portion of the terminals inside the cell where the base station has not collapsed may transmit the first preamble, which may be performed in the case where the terminal receives a structure signal of a terminal of a neighbor cell (where an infrastructure has been damaged) or via a request of a relevant base station. That is, when not receiving a preamble signal from a base station for a predetermined time, the terminal tries to receive the first preamble or the second preamble.

Figure 2:
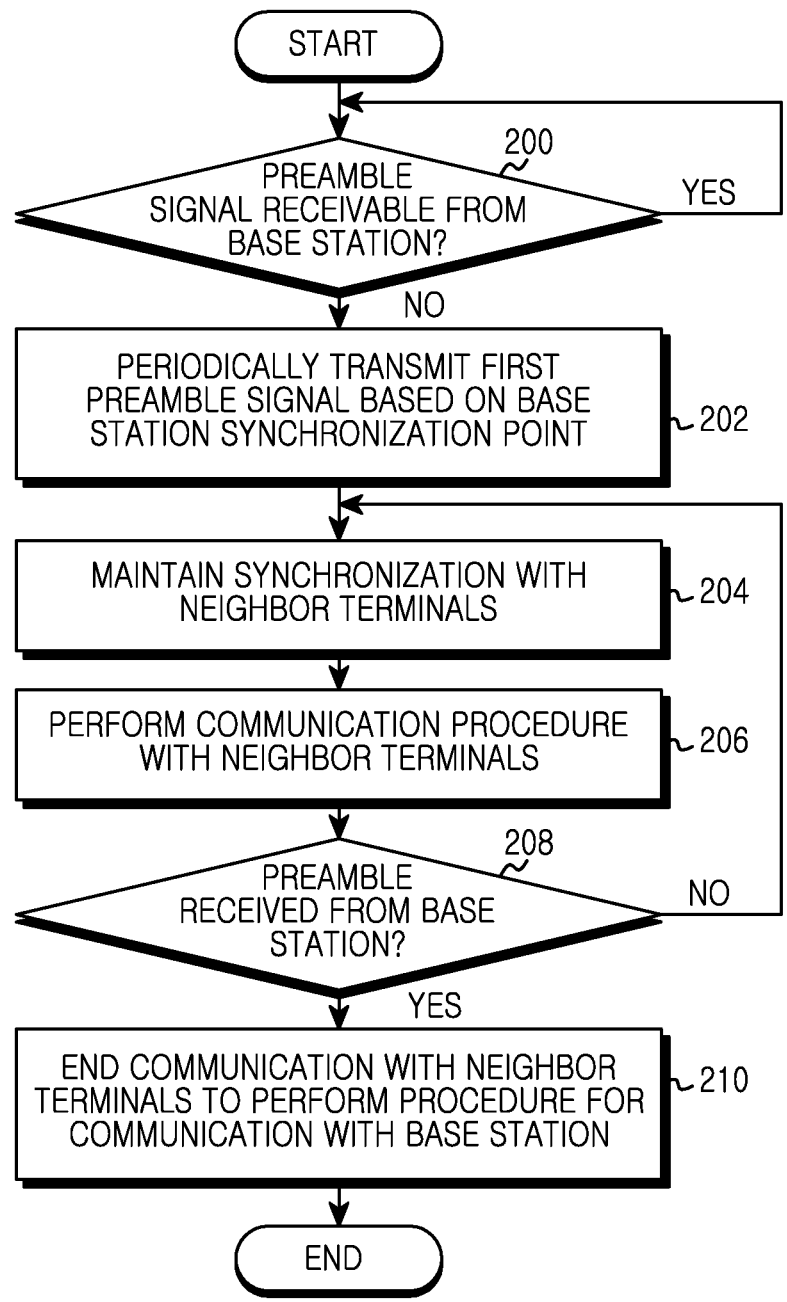
FIG. 2 is a flowchart illustrating a first terminal operation for direct communication between devices in a case where an infrastructure does not operate according to an exemplary embodiment of the present invention.

FIG. 2 is a flowchart illustrating a first terminal operation for direct communication between devices in a case where an infrastructure does not operate according to an exemplary embodiment of the present invention.

Referring to FIG. 2, when it is determined that a preamble is not received from the base station 110 for at least a predetermined time in step 200, a terminal 114 that maintains base station synchronization proceeds to step 202 to periodically broadcast the first preamble signal based on a base station synchronization point.

In step 204, the terminal 114 tries to obtain synchronization with a neighbor terminal 113 based on the first preamble signal, and performs communication with the neighbor terminal 113 in step 206. Here, the first preamble is transmitted at the same point as the point at which the preamble of the base station is transmitted based on a previous base station synchronization point. Of course, the transmission of the first preamble is performed in accordance with a predetermined transmission period of the preamble, which may be the same as the transmission period of an existing system. That is, the terminal 114 continues to transmit the first preamble according to the predetermined transmission period, obtains synchronization with a neighbor terminal based on the transmitted first preamble, and starts a procedure for communication between terminals.

In step 208, the terminal 114 determines if a preamble signal is received from the base station 110. When receiving a preamble signal from the base station 110, the terminal 110 proceeds to step 210. When not receiving the preamble signal from the base station 110, the terminal 110 returns to step 204.

In step 210, the terminal 114 ends direct communication with neighbor terminals and performs a procedure for communication with the base station 110.

Meanwhile, terminal 113 that has obtained synchronization via the first preamble tries to receive a base station preamble for each predetermined transmission period. When receiving the preamble of the base station, the terminal 113 tries to perform a procedure for communication with the base station 110 again.

After that, the terminal 114 ends the procedure of an exemplary embodiment of the present invention.

The method described above in relation with FIG. 2 under of the present invention may be provided as one or more instructions in one or more software modules stored in the respective terminals.

Figure 3A:
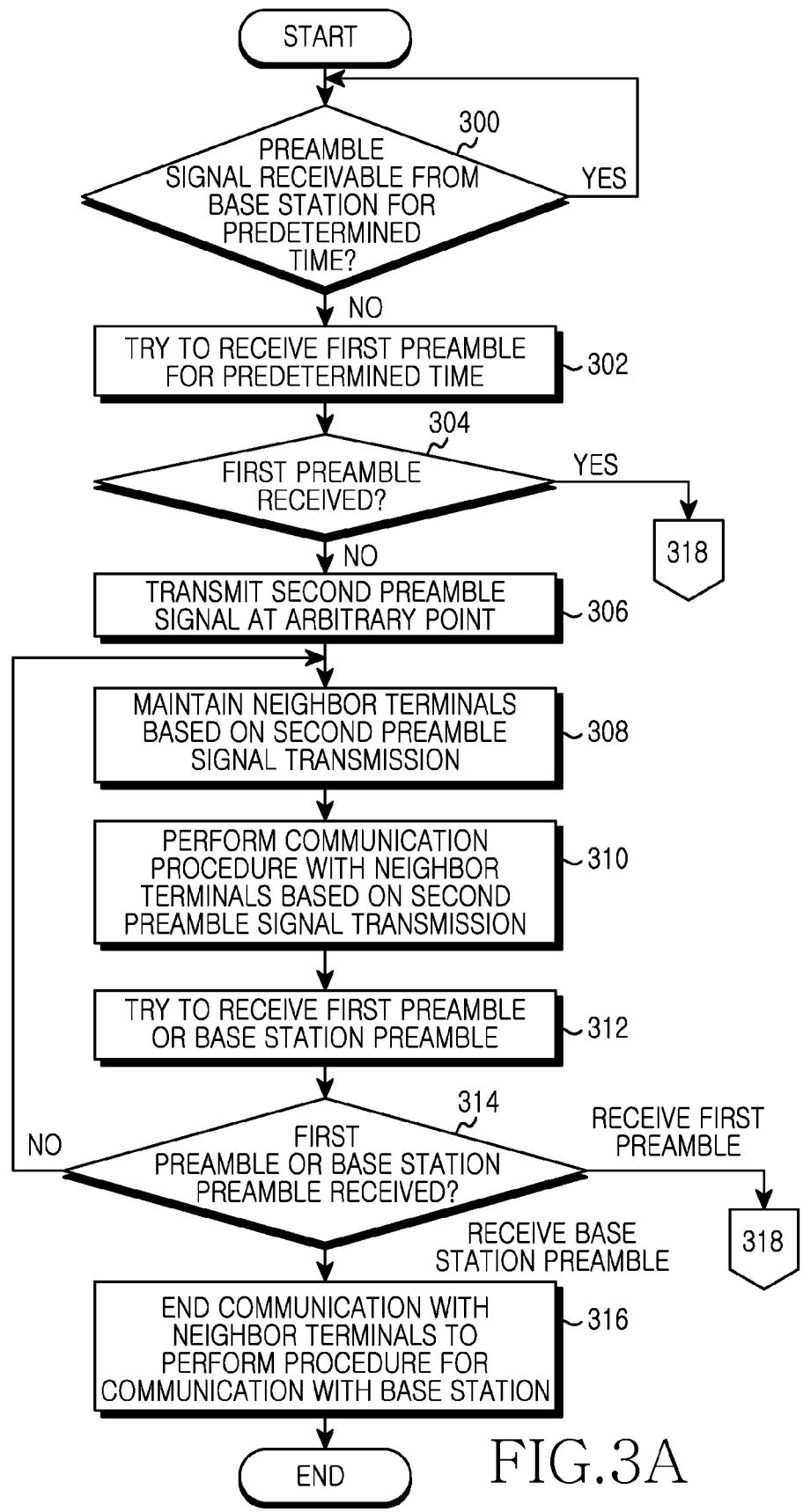
FIGS. 3A and 3B illustrate a flowchart of a second terminal operation for direct communication between devices in a case where an infrastructure does not operate according to an exemplary embodiment of the present invention.
Figure 3B:
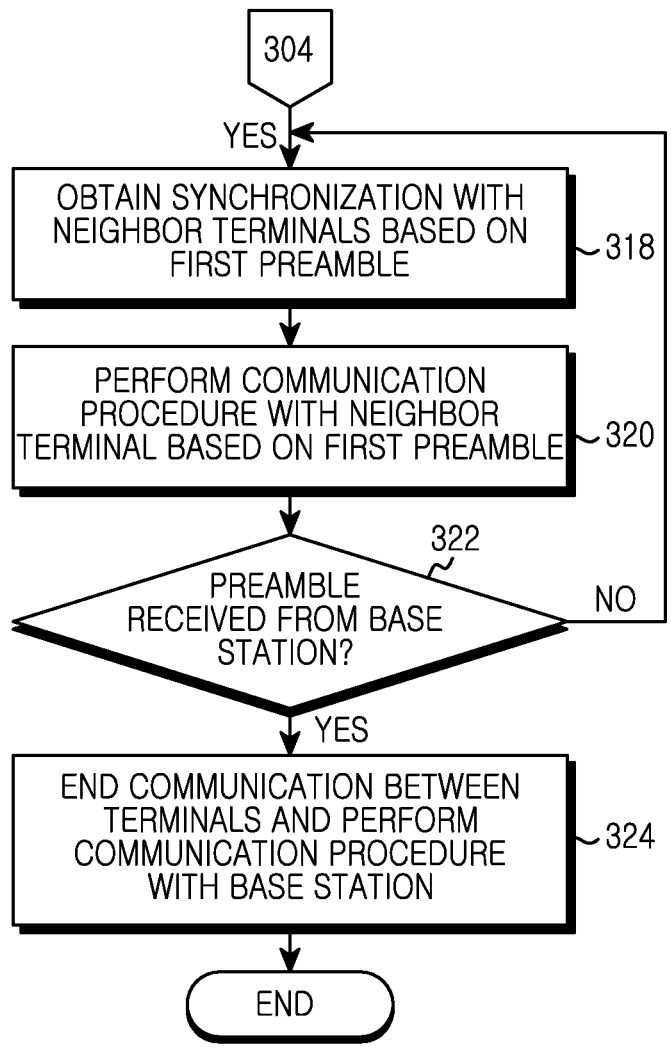

FIGS. 3A and 3B illustrate a flowchart of a second terminal operation for direct communication between devices in a case where an infrastructure does not operate according to an exemplary embodiment of the present invention.

Referring to FIGS. 3A and 3B, when it is determined in step 300 that a preamble signal from a base station is not received for a predetermined time, for example due to collapse of the base station, the terminal proceeds to step 302 to monitor a first preamble signal.

In step 304, the terminal monitors and determines if the first preamble signal that may be transmitted by a portion of neighbor terminals for a predetermined time is received. When receiving the first preamble signal, the terminal proceeds to step 318. When not receiving the first preamble signal, the terminal proceeds to step 306.

When not receiving the first preamble signal, the terminal transmits the second preamble from an arbitrary point in step 306. The transmission of the second preamble is performed at a predetermined period, which may be the same as the transmission period of the existing system.

After that, the terminal maintains synchronization with neighbor terminals based on the second preamble signal according to a predetermined procedure in step 308.

The terminal performs a communication procedure with neighbor terminals based on the second preamble signal in step 310.

After that, the terminal monitors the preamble signal from the base station or the first preamble signal from neighbor terminals in step 312. It is determined in step 314 whether the preamble signal from the base station or the first preamble signal from the neighbor terminals is received. When not receiving the preamble signal from the base station or the first preamble signal from the neighbor terminals, the terminal returns to step 308 to maintain synchronization based on the second preamble signal.

In contrast, when receiving the preamble signal from the base station, the terminal proceeds to step 316. When receiving the first preamble signal from the neighbor terminals, the terminal proceeds to step 318.

The terminal ends communication with a neighbor terminal and performs a communication procedure with the base station based on the received base station preamble in step 316.

In step 318, the terminal is synchronized with a neighbor terminal based on the first preamble signal, and performs a communication procedure with a neighbor terminal using the first preamble signal in step 320.

In addition, the terminal monitors to determine if the preamble signal is received from the base station in step 322. When receiving the preamble signal from the base station, the terminal proceeds to step 324. When not receiving the preamble signal from the base station, the terminal returns to step 318.

The terminal ends direct communication with neighbor terminals and performs a procedure for communication with the base station in step 324.

That is, terminals that have not maintained base station synchronization continue to transmit the second preamble signal according to a predetermined period to obtain synchronization with a neighbor terminal based on the second preamble and start a procedure for communication between terminals. Meanwhile, terminals that have obtained synchronization via the second preamble try to receive a base station preamble and the first preamble for each predetermined period. When receiving the first preamble, the terminals transmit the first preamble at a point of receiving the first preamble. The operation at this point is the same as the operation in FIG. 2. In addition, when receiving the base station preamble, the terminals try to perform the procedure for communication with the base station again.

The method described above in relation with FIG. 3 under of the present invention may be provided as one or more instructions in one or more software modules stored in the respective terminals.

Figure 4:
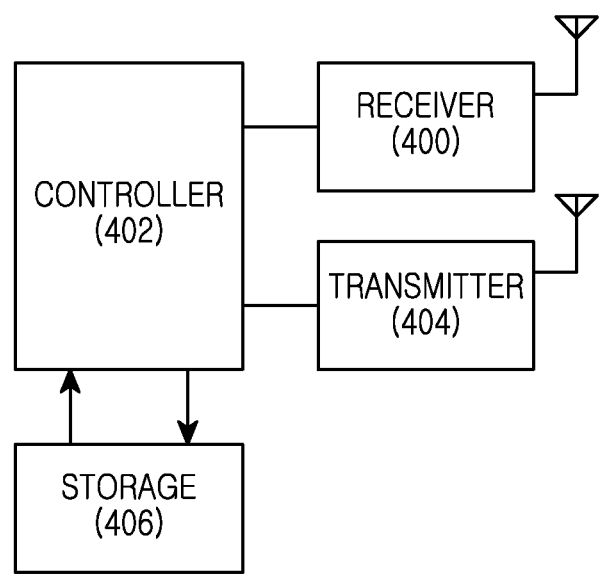
FIG. 4 is a block diagram illustrating a terminal apparatus for direct communication between devices in the case where an infrastructure does not operate according to an exemplary embodiment of the present invention.

FIG. 4 is a block diagram illustrating a terminal apparatus for direct communication between devices in a case where an infrastructure does not operate according to an exemplary embodiment of the present invention.

The terminal apparatus may be an electronic device such as, for example, a laptop, a smart phone, a net book, a mobile interne device, an ultra mobile PC, a tablet personal computer, a mobile telecommunication terminal, PDA having a camera and the like herein, just to name some of the possibilities.

Referring to FIG. 4, the terminal apparatus includes a receiver 400, a controller 402, a transmitter 404, and a storage 406. Depending on realization, the terminal apparatus may further include additional functional blocks.

The receiver 400 converts a Radio Frequency (RF) signal received via an antenna into a baseband analog signal, and converts the analog signal into sample data. In addition, the receiver 400 performs Fast Fourier Transform (FFT) on the sample data to convert the sample data into data in a frequency domain, selects data of subcarriers which a user desires to actually receive from the data in the frequency domain, and outputs the same. In addition, the receiver demodulates and decodes the data according to a predetermined Modulation and Coding Scheme (MCS) level, and outputs the same to the controller 402. For example, the receiver 400 receives the preamble signal of the base station, the first preamble signal or the second preamble signal from a neighbor terminal to perform the FFT operation.

The controller 402 controls an overall operation of the terminal. In addition, the controller 402 is provided with necessary information while performing a protocol process from a relevant constituent (for example, the receiver 400) of a physical layer, or generates a control signal to a relevant constituent (for example, the transmitter 404) of the physical layer. For example, the controller 402 controls a synchronization procedure for direct communication between devices when a base station collapses. Specifically, in case of maintaining base station synchronization, the controller 402 transmits the first preamble signal via the transmitter 404 based on the base station synchronization and is synchronized with a neighbor terminal based on the first preamble signal. Even when the controller 402 is synchronized with a neighbor terminal based on the first preamble signal, the controller 402 periodically monitors a preamble signal from the base station afterward. That is, the controller 402 controls the synchronization procedure between devices described in FIG. 2.

Meanwhile, in case of not maintaining base station synchronization, the controller 402 continues to transmit the second preamble signal according to a predetermined period to obtain synchronization with a neighbor terminal based on the second preamble and start a procedure for communication between terminals. Meanwhile, terminals that have obtained synchronization via the second preamble try to receive the base station preamble and the first preamble for each predetermined period. When receiving the first preamble, the terminals transmit the first preamble at a point of receiving the first preamble. When receiving the base station preamble, the terminals try to perform a procedure for communication with the base station again. That is, the controller 402 controls the synchronization procedure between devices described in FIGS. 3A and 3B.

The storage 406 stores a preamble code corresponding to the first preamble signal used when the base station collapses and a preamble code corresponding to the second preamble signal to provide the same to the controller 402 when needed.

The transmitter 404 encodes and modulates data from the controller 402 according to a predetermined MCS level. In addition, the transmitter 404 performs Inverse Fast Fourier Transform (IFFT) on a modulated symbol to output sample data (e.g., an Orthogonal Frequency Division Multiplexing (OFDM) symbol). For example, the transmitter 404 performs the IFFT on the first preamble signal or the second preamble signal to transmit to a neighbor terminal.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As described above, the first preamble signal transmitted at the same point as the transmission point of the base station preamble and transmitted by the terminal when the base station does not operate, and the second preamble signal transmitted at an arbitrary point regardless of the transmission point of the base station preamble and transmitted by the terminal when the base station does not operate are used, so that terminals inside a cell area of a base station that no longer provides a service may maintain base station synchronization. In addition, interference between terminals inside the cell area of the collapsed base station and terminals inside the cell area of a base station that has not collapsed may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal, the method comprising:
   monitoring a preamble signal from a base station;
   transmitting a first preamble signal based on a synchronization with the base station, if the terminal fails to receive the preamble signal from the base station; and
   performing communication with a neighbor terminal which receives the first preamble signal from the terminal.

2. The method of claim 1, wherein the first preamble signal indicates that the terminal fails to receive the preamble signal from the base station.

3. The method of claim 1, further comprising:
   monitoring the preamble signal received from the base station;
   if the preamble signal is received from the base station, performing synchronization based on the preamble signal; and
   performing communication with the base station.

4. The method of claim 1, wherein the first preamble signal comprises a sequence which is different from sequences for the preamble signal transmitted by the base station.

5. A method for operating a terminal, the method comprising:
   monitoring a preamble signal from a base station;
   monitoring a first preamble signal from a neighbor terminal, if the terminal fails to receive the preamble signal from the base station;
   transmitting a second preamble signal, if the terminal fails to receive the first preamble signal; and
   performing communication with a first neighbor terminal which receives the second preamble signal.

6. The method of claim 5, wherein the first preamble signal indicates that the terminal fails to receive the preamble signal from the base station.

7. The method of claim 5, further comprising:
   monitoring a preamble signal from a base station; and
   if the preamble signal is received from the base station, performing synchronization based on the preamble signal to communicate with the base station.

8. The method of claim 5, further comprising:
   monitoring a first preamble signal from a second neighbor terminal; and
   if the first preamble signal is received from the second neighbor terminal, performing synchronization based on the first preamble signal to communicate with the second neighbor terminal.

9. The method of claim 8, further comprising:
   monitoring a preamble signal from a base station; and
   if the preamble signal is received from the base station, performing synchronization based on the preamble signal to communicate with the base station.

10. The method of claim 5, further comprising:
    monitoring a preamble signal from a base station and a first preamble signal from a relevant neighbor terminal; and
    maintaining synchronization with the first neighbor terminal, if the terminal fails to receive the preamble signal from the base station and the first preamble signal from the neighbor terminal.

11. The method of claim 5, wherein the second preamble signal comprises a sequence which is different from sequences for the preamble signal transmitted by the base station.

12. The method of claim 5, wherein the first preamble signal is transmitted based on a synchronization with the base station.

13. The method of claim 5, wherein the second preamble signal indicates that the terminal fails to receive the preamble signal from the base station.

14. An apparatus for a terminal, the apparatus comprising:
    a controller configured to monitor a preamble signal from a base station; and
    a transmitter configured to, transmit a first preamble signal based on synchronization with the base station, if the terminal fails to receive the preamble signal from the base station,
    wherein the controller is further configured to perform communication with a neighbor terminal which receives the first preamble signal from the terminal.

15. The apparatus of claim 14, wherein the first preamble signal indicates that the terminal fails to receive the preamble signal from the base station.

16. The apparatus of claim 14, wherein the controller is further configured to:
    monitors the preamble signal received from the base station; and
    perform synchronization based on the preamble signal if the preamble signal is received from the base station; and
    perform communication with the base station.

17. The apparatus of claim 14, wherein the first preamble signal comprises a sequence which is different from sequences for the preamble signal transmitted by the base station.

18. An apparatus for a terminal, the apparatus comprising:
a controller configured to monitor a preamble signal from a base station, and, to monitor a first preamble signal from a neighbor terminal, if the terminal fails to receive the preamble signal from the base station; and
a transmitter configured to transmit a second preamble signal, if the terminal fails to receive the first preamble signal,
wherein the controller is further configured to perform communication with the at least one neighbor terminal which receives the second preamble signal.

19. The apparatus of claim 18, wherein the first preamble signal indicates that the terminal fails to receive the preamble signal from the base station.

20. The apparatus of claim 18, wherein the controller is further configured to monitor a preamble signal from a base station; and
to perform synchronization based on the preamble signal to communicate with the base station if the preamble signal is received from the base station.

21. The apparatus of claim 18, wherein the controller is further configured to monitor a first preamble signal from a second neighbor terminal, and to perform synchronization based on the first preamble signal to communicate with the second neighbor terminal if the first preamble signal is received from the second neighbor terminal.

22. The apparatus of claim 21, wherein the controller is further configured to monitor a preamble signal from a base station, and, to perform synchronization based on the preamble signal to communicate with the base station if the preamble signal is received from the base station.

23. The apparatus of claim 18, wherein the controller is further configured to monitor a preamble signal from a base station and a first preamble signal from a neighbor terminal, and to maintains synchronization with the first neighbor terminal if the terminal fails to receive the preamble signal from the base station and the first preamble signal from the neighbor terminal.

24. The apparatus of claim 18, wherein the second preamble signal comprises a sequence which is different from sequences for the preamble signal transmitted by the base station.

25. The apparatus of claim 18, wherein the first preamble signal is transmitted based on a synchronization with the base station.

26. The apparatus of claim 18, wherein the second preamble signal indicates that the terminal fails to receive the preamble signal from the base station.

* * * * *